J. W. PIATT.
GAS MIXING CHAMBER FOR BURNERS.
APPLICATION FILED DEC. 9, 1916.

1,275,466.

Patented Aug. 13, 1918.
2 SHEETS—SHEET 1.

INVENTOR:
J. W. PIATT,
By his Attorney John O. Seifert

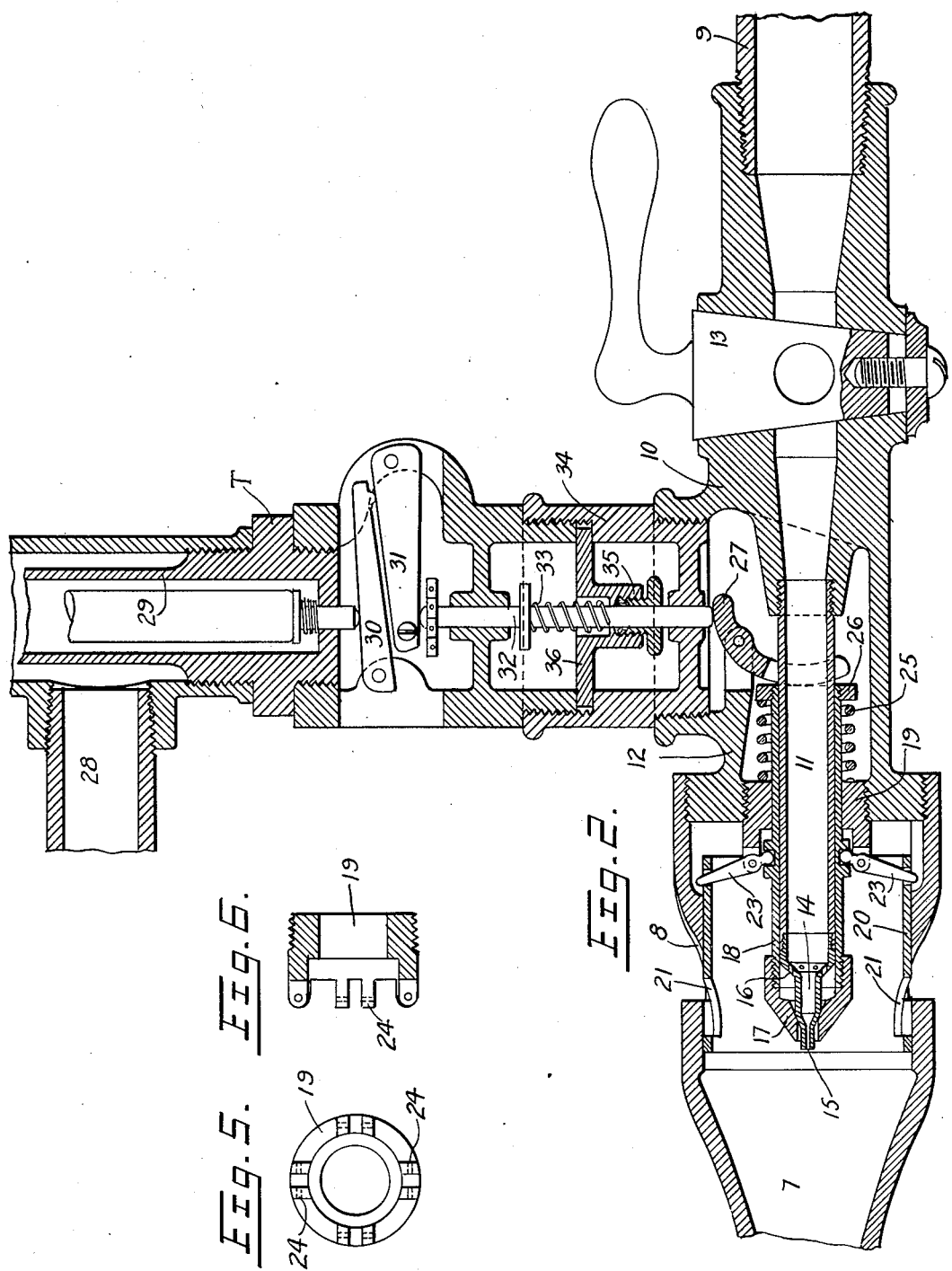

UNITED STATES PATENT OFFICE.

JOSEPH W. PIATT, OF NEW YORK, N. Y., ASSIGNOR TO L. H. PIATT, OF NEW YORK, N. Y.

GAS-MIXING CHAMBER FOR BURNERS.

1,275,466.　　　　　Specification of Letters Patent.　　Patented Aug. 13, 1918.

Application filed December 9, 1916.　Serial No. 135,930.

*To all whom it may concern:*

Be it known that I, JOSEPH W. PIATT, a citizen of the United States, and a resident of the borough of Manhattan, in the city, county, and State of New York, have invented certain new and useful Improvements in Gas-Mixing Chambers for Burners, of which the following is a specification.

This invention relates to air and gas mixing chambers for gaseous fuel for burners in which valve mechanism is provided to control the flow of the air and gas to said chamber, and it is the object of the invention to provide an improved mixing chamber of this character to improve the general construction and increase the efficiency thereof.

It is a further object of the invention to provide a mixing chamber of this character particularly adapted to be used in connection with gas burners for heaters, such as water heaters for a hot water supply, or for steam generation, in which the valve mechanism to control the flow of air and gas to the mixing chamber is automatically controlled in accordance with the temperature of the water being heated or the steam generated.

In the drawings accompanying and forming a part of this specification, Figure 1 is a longitudinal sectional view of a mixing chamber with an embodiment of my invention applied thereto and a thermostatically operated means to actuate the valves, showing the valves in open position.

Fig. 2 is a view similar to Fig. 1 but showing the parts in position with the valves partly closed.

Fig. 5 is an end elevation of a detail of the means to actuate the valve for the air inlet; and Fig. 6 is a longitudinal sectional view of the detail shown in Fig. 5.

Similar characters of reference designate like parts throughout the different views of the drawings.

Figure 4:
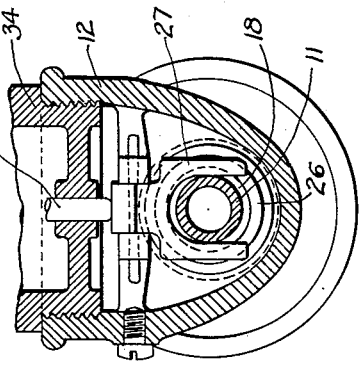
Fig. 4 is a cross sectional view taken on the line 4—4 of Fig. 1 looking in the direction of the arrow with the thermostat broken away.
Figure 1:
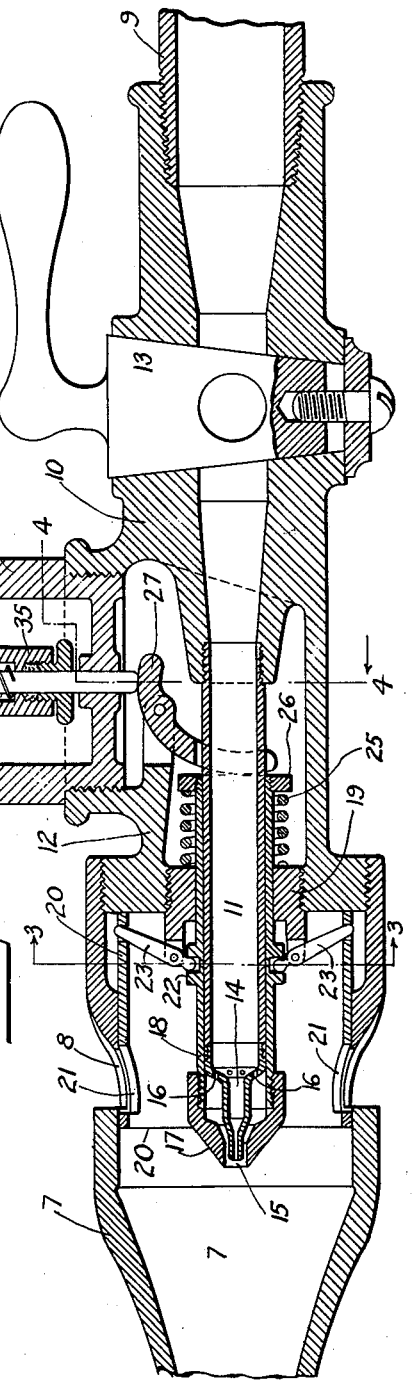
Figure 3:
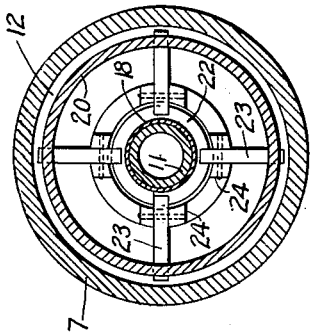
Fig. 3 is a cross sectional view taken substantially on the line 3—3 of Fig. 1 looking in the direction of the arrows.

The embodiment of my invention illustrated in the drawings comprises a chamber 7 connected to a gas burner (not shown) or constituting an integral part thereof, said chamber being tubular in form and having lateral ports 8 to serve as air inlets to the mixing chamber. The chamber is also connected to a source of gas supply through a pipe 9 connected to the mixing chamber through a valve chamber 10 by a tube 11 extending into the mixing chamber to a point slightly beyond the air inlets 8, the valve chamber having an extended part 12 to close one end of the mixing chamber, and for a further purpose to be hereinafter described. The flow of gas from the source of supply to the mixing chamber may be shut off and turned on by a manually operable valve 13.

Fixed to one end of the pipe 11 is a nozzle or nipple 14 having a central outlet port 15 and a series of ports 16 circumferentially disposed around said central port 15 and located in a cone-shaped portion of the nozzle, thereby permitting of a tubular flow of gas around the stream of gas entering the mixing chamber through the central port 15. The flow of gas through the nozzle is controlled by a valve 17 in the form of a cap conforming to the shape of the nozzle and having a central opening co-axial with the outlet 15 to permit of the flow of gas to the mixing chamber at all times through said central port 15. The valve 17 is carried by a tube 18 slidably mounted on the gas inlet tube 11 and extends through a collar 19 into the extending portion of the valve chamber 10, and by adjusting this sleeve longitudinally and therewith the valve the flow of gas through the ports 16 is regulated.

For the proper combustion of gas it is necessary that the proper proportion of air be mixed therewith, as too much air is just as deleterious as an insufficient supply. For this purpose a valve 20, in the form of a sleeve, is mounted in the mixing chamber to have longitudinal movement, and has ports 21 to be placed in register with the inlet ports 8 to increase or decrease the area of said inlet ports. This valve is movable simultaneously with the movement of gas control valve 17 to diminish the supply of air with the diminishing supply of gas and to increase the supply of air with the increase in the supply of gas. To impart this movement to the air-control valve synchronously with the movement of the gas control valve the tube 18 has an annular groove 22, or which groove may be formed in a collar fixed to said tube, in which one end of rocker arms or levers 23 pivotally carried by ears 24 engage with the other end of the arms engaging in slots in the valve 20. It will be obvious that as the valve 17 is moved to increase the flow of gas through the ports 16 the valve 20 will be moved in an opposite direction to increase the area of the inlet ports 8, and the valve 20 is moved forward to decrease the area of said latter ports when the gas control valve is moved to the rear to decrease the flow of the gas.

The valves 17 and 20 are normally urged in a direction to shut off the supply of gas and air by a spring 25 coiled about the slidable tube 18 in the extension of the valve chamber 10 and confined between the collar 19 and the collar 26 secured to the end of the tube 18. Movement is imparted to the valves against the tension and action of the spring 25 by a pivoted lever 27 having a bifurcated end to engage with the collar 26 at opposite sides of the tube 18.

The valves 17 and 20 are automatically controlled in accordance with the temperature of water being heated or steam generated in a boiler by a burner connected to or of which the mixing chamber constitutes a part, and is controlled by a thermostat (designated in a general way by T) connected in circuit, as at 28, with such boiler. This thermostat has the usual expanding and contracting element 29 coöperating through leverage or movement increasing levers 30, 31 with a slidably supported stem 32 normally urged in a direction opposite to the expansion movement of the expansible and contractile element 29 of the thermostat by a spring 33. This stem slidably engages in and projects through a coupling member 34 to connect the thermostat to and support it by the extended portion 12 of the valve chamber 10, and also passes through a stuffing box 35 carried by a disk 36 clamped between the coupling 34 and the casing of the thermostat. By this construction the possibility of leakage of gas to the thermostat is obviated. The end of the stem 32 extending through the coupling 34 engages with the lever 27, and as the temperature of the water in the boiler being heated or steam generated is lowered the thermostat through the stem 32 will operate to increase the supply of gas and air to the burner through the mixing chamber by increasing the fuel supply to the burner and the increasing of the heat at the burner.

Having thus described my invention, I claim:

1. The combination of a mixing chamber having air inlet ports; a valve to open and close said ports; a tube connected to a source of gas supply extending into said chamber having an outlet into the chamber; a valve to control the opening and closing of said outlet; a spring operating to normally urge the gas control valve to a closed position; means operable by the movement of the gas outlet valve to simultaneously close the air inlet valve for the mixing chamber; and means operable against the action of the spring to open the gas control valve and simultaneously with the opening of said valve open the air inlet valve to the mixing chamber, substantially as and for the purpose specified.

2. The combination of a mixing chamber having air inlet ports; a valve to open and close said ports; a tube connected to a source of gas supply extending into said chamber having an outlet into the chamber; a valve to control the opening and closing of said outlet; a spring operating to normally urge the gas control valve to closed position; means operable by the movement of the gas control valve to simultaneously move the air inlet control valve to closed position simultaneously with the closing movement of the gas control valve; and a pivoted lever to impart movement to the gas control valve against the action of the spring to move said valve to open position and simultaneously with this opening movement of the gas control valve impart movement to the air control valve to the mixing chamber to open position.

3. The combination of a mixing chamber having air inlet ports; a valve to open and close said ports; a tube connected to a source of gas supply extending into said chamber having an outlet into the chamber; a valve to control the opening and closing of said outlet; levers operatively connected to the gas control valve and to the air inlet control valve; and a spring to normally urge the gas control valve to closing position and through the movement of the latter the air inlet control valve for the mixing chamber to closing position through the levers.

Signed at the city of New York, in the county of New York, and State of New York, this 2nd day of December, 1916.

JOSEPH W. PIATT.